United States Patent [19]

Burke

[11] Patent Number: 5,298,173
[45] Date of Patent: Mar. 29, 1994

[54] METHOD OF NEUTRALIZING ACIDIFIED SURFACE WATER

[75] Inventor: W. Roy Burke, Tonawanda, N.Y.

[73] Assignee: National Gypsum Company, Charlotte, N.C.

[21] Appl. No.: 90,449

[22] Filed: Jul. 12, 1993

Related U.S. Application Data

[62] Division of Ser. No. 921,775, Jul. 30, 1992, which is a division of Ser. No. 456,752, Dec. 26, 1989, Pat. No. 5,158,835.

[51] Int. Cl.$^5$ .............................................. C02F 1/66
[52] U.S. Cl. .................................. 210/747; 210/724; 210/749; 210/198.1
[58] Field of Search ............... 210/170, 747, 749, 724, 210/198.1

[56] References Cited

U.S. PATENT DOCUMENTS

| | | | |
|---|---|---|---|
| 2,546,586 | 3/1951 | Cross, Jr. | 166/21 |
| 3,414,462 | 12/1968 | Cafferata | 161/166 |
| 4,822,579 | 4/1989 | Wagner | 422/263 |
| 5,039,427 | 8/1991 | Conover | 210/747 |
| 5,158,835 | 12/1992 | Burke | 428/703 |

*Primary Examiner*—Neil M. McCarthy
*Attorney, Agent, or Firm*—Marshall, O'Toole, Gerstein, Murray & Borun

[57] ABSTRACT

Blocks, weighing about 35 lbs., formed of a homogeneous mixture of about 75% gypsum and 25% lime, are strategically placed in surface water that is being damaged by acid rain, where, by timed release of lime, the pH of the water is maintained at about 6.5 pH.

6 Claims, No Drawings

METHOD OF NEUTRALIZING ACIDIFIED SURFACE WATER

This application is a divisional application of my copending application, U.S. patent application Ser. No. 07/921,775, filed Jul. 30, 1992, which is a divisional application of U.S. patent application Ser. No. 07/456,752, filed Dec. 26, 1989, now U.S. Pat. No. 5,158,835.

FIELD OF THE INVENTION

The present invention relates to the problem commonly referred to as "acid rain" and particularly to a gypsum-lime acid rain neutralizing block, a method of making a gypsum-lime acid rain neutralizing block and a method of using gypsum-lime acid rain neutralizing blocks to counteract the acidity of surface water, particularly lakes and streams, caused by acid rain.

BACKGROUND OF THE INVENTION

A number of products and processes have been proposed heretofore directed at counteracting the acidity of streams and lakes which results from acid rain. All such products and processes have had various shortcomings whereby no universally acceptable solution has been found to overcome this problem.

One approach has been to spread lime, CaO or Ca(OH)$_2$, in powdered or pellet form, onto the surface of the body of water to be treated. Used in large quantities, this high pH material alters pH of the surface water very rapidly, causing detrimental effects to any living matter in the lake or stream. If used in small quantities, the treatment is short-lived, requiring frequent, time consuming applications.

Recent research involved attempts at neutralizing the acidic effect of acid rain on fresh water by slowly disintegrating portland cement concrete placed in the water to be treated.

In dealing with a somewhat remote problem, U.S. Pat. No. 2,546,586 proposes combining 55 parts plaster with 45 parts hydrated lime and 5 parts diatomaceous earth to form slightly soluble pellets to raise the pH of oil well brine from 6.4 up to 8.6 and thus prevent corrosion of the tubing in the well.

In order to produce an insoluble cementitious block for exterior building walls, U.S. Pat. No. 3,414,462 teaches combining from about 10% to about 90% lime with about 90% to 10% plaster, adding water, compressing the mix to at least 100 p.s.i., and carbonating the lime on the exposed surface.

SUMMARY OF THE INVENTION

According to the present invention, settable calcined gypsum is mixed with hydrated lime (calcium hydroxide) and sufficient water to hydrate and cause setting of the gypsum under ambient conditions and to produce handleable rigid blocks, weighing between about 2 and 100 pounds, and consisting of set gypsum to lime ratios of between about 80:20 and 65:35, with dimensions in all directions within the range of about 3 to 15 inches.

The gypsum-lime blocks are placed in streams and lakes having an undesirable condition caused by acid rain, in sufficient numbers to maintain a pH of about 6 to 6.5, for a period of several months.

It is an object of the present invention to provide a novel cementitious block for treatment of excessively acidified lakes and streams, and to the method of making such blocks.

It is a further object to provide a novel method of maintaining the pH of lakes and streams being affected by acid rain at about 6 to 6.5, and to provide the novel improved lakes and streams containing the gypsum-lime blocks.

These and other objects and advantages of the invention will be more readily apparent when considered in relation to the preferred embodiments of the invention as set forth in the following specification.

DESCRIPTION OF THE PREFERRED EMBODIMENTS

Example I

In accordance with the present invention, a cementitious block of 25% lime is prepared using the following formulation:

|  | lbs. |
| --- | --- |
| Calcined Gypsum (CaSO$_4$.½H$_2$O) (density about 2.8) | 22.67 |
| Hydrated Lime (Ca(OH)$_2$) (density - 2.24) | 8.75 |
| Set Retarder | .01 |
| Water | 24.33 |

A slurry of the above ingredients is mixed in a suitable paddle mixer for at least one minute at a slow speed, producing a homogeneous cementitious slurry. This slurry is placed in a mold measuring 7⅝"×7⅝"×15-9/16", a commonly used mold size for cement blocks, and left for a time sufficient for the settable gypsum (CaSO$_4$.½ H$_2$O) to set forming set gypsum, CaSO$_4$.2H$_2$O, which, according to technical handbooks, has a density of 2.32. When set, the resultant rigid gypsum-lime block is removed and dried. This forming, setting and drying is all carried out at normal atmospheric pressures.

Drying can be done at room temperatures, or, to accelerate the process, at temperatures up to approximately 200° F., preferably in moving, relatively dry air. Care should be taken to avoid calcining the gypsum. Drying may be omitted if weight of the finished product is not important.

When dried, the block has a weight of about 35 pounds, and is immediately in a condition suitable for use, in accordance with the invention, in acid rain affected surface water, such as lakes and streams. The gypsum-lime blocks are placed on the bottom of lakes and streams which are being Constantly subjected to the detrimental effects of acid rain.

The number of 35-lb. blocks that should be placed in any specific lake or stream will be dependent on the amount of acidified water that will need to be treated, and the severity of the acid rain problem. The amount of water to be treated will depend on the size of the lake or stream, the rate of movement of water into and out of the lake or stream, and the swiftness of water moving past the block. The severity of the acid rain problem will depend upon the location of the lake or stream and upon the area of surrounding land, called the watershed, which, when rained upon, drains into the lake or stream.

Experimentation has shown that two 35-lb., 25% lime blocks prepared as described hereabove will slowly change a typical one-acre, one-foot-deep lake from a pH of 4.5 to a pH of about 6.5.

Example II

As another example of the invention, gypsum-lime blocks may be prepared differing from those of Example I, in that the ratio of set gypsum to hydrated lime was 62.5:37.5. In order to determine some of the characteristics of a 37.5% lime block, 2-inch gypsum-lime cubes of 37.5% lime were made and tested. The 37.5% lime cubes were compared with 0% lime gypsum 2-inch cubes and with gypsum-lime 2-inch cubes of 25% and of 50% lime.

Average densities of the 0, 25, 37.5 and 50 percent lime cubes were 63.4, 60.9, 55.2 and 49 pcf, respectively. The results of compressive strength tests were 1530, 890, 580 and 315 psi, respectively. The 580 psi (37.5% lime) specimens were borderline in handleability.

In a steel ball drop test, the 0% lime specimen significantly outperformed the others, the 25% and 37.5% lime specimens were nearly alike and the 50% lime specimen shattered.

In dissolution tests with similar 2-inch cubes of 0%, 25%, 37.5% and 50% lime, the 25% lime cubes lost the least weight and volume when submerged in water at 68o-70o F., with water being changed 30 times at minimum periods of 24 hours. The 37.5% lime cubes lost the second least weight and volume.

Accordingly, from the results of these tests, it is concluded that the gypsum-lime blocks of the invention may be varied from about a 20% lime content to about a 35% lime content, in order to obtain the critical slow "time release" of the lime, which provides the prolonged treatment period.

Additional Examples

In addition to the embodiments of Examples I and II, it is contemplated that the gypsum-lime blocks of the present invention can be prepared from a mixture of gypsum with other alkaline materials; such as, sodium hydroxide, alkaline fly ash, limestone, sodium bicarbonate or sodium carbonate which, respectively, have commonly known densities of 2.13, about 2.1 to 2.7, 2.71 to 2.93, 2.159 and 2.53.

The weight and size of the gypsum-lime block of the invention is preferably about 35 pounds and about 1000 cubic inches, however the weight and size may be as little as 2 pounds, such as about a 4-inch cube. A 4-inch cube is about as small as can be effective considering likelihood of cubes smaller than that being made ineffective by the stagnancy of water in a silt or mud covered floor of a lake or stream. The gypsum-lime blocks of the invention will preferably be in a range of 10 to 75 pounds, or better, from about 25 to 50 pounds, thus manually handleable, with substantial portions which are not submerged in the silt and mud.

To illustrate how smaller cubes of 75% gypsum-25% lime become relatively ineffective, a plurality of 1-inch cubes, 2-inch cubes and 4-inch cubes were placed in 5-gallon buckets, with one inch of sand around the cubes to simulate muck or silt. Each bucket was filled with 12 liters of water and the water was changed carefully each day, through side wall drains, for 30 days.

At the end of the test, the cubes were dried and weighed. The one-inch cubes lost 6.3% of the original weight, the 2-inch cubes lost 15.2% of their original weight and the 4-inch cube lost 21.4% of its original weight.

TREATMENT OF SURFACE WATER

The gypsum-lime blocks, described above, when fully set and hardened, are placed on the bottom of lakes or streams requiring deacidification. The blocks will preferably be placed where there is movement of the water, such as an inlet into a lake requiring treatment. They are preferably placed where the water depth is greater than the height of the blocks, but easily accessible for carrying the blocks for placement.

Occasional testing of the lake water will reveal whether more or less blocks are required. Lakes which require treatment will commonly have a pH below 5. Proper treatment with gypsum-lime blocks will maintain a pH of about 6 or more, with replacement of blocks being required only about once every one to three years.

Two thirty-five pound, 25% lime blocks, with their timed release of lime, should be adequate to treat a one-acre-foot volume of water.

Careful planning in the placement of gypsum-lime blocks can also result in forming a reef, for improving sport fishing, in some lakes.

Having completed a detailed disclosure of the preferred embodiments of my invention so that those skilled in the art may practice the same, I contemplate that variations may be made without departing from the essence of the invention or the scope of the appended claims.

I claim:

1. The method of treating surface water which is being detrimentally affected by acid rain comprising the step of placing gypsum-alkaline material blocks weighing at least about two pounds and having a wet density suitable for placement on the bottom of lakes and streams and a height of at least about three inches in said water, said blocks consisting essentially of a homogeneous mixture of set gypsum and an alkaline material, formed without consolidation at atmosphere pressures or equivalent, with a weight ratio of gypsum to alkaline material of from about 80:20 to about 65:35.

2. The method of claim 1 wherein said alkaline material is lime.

3. The method of claim 1 wherein said blocks are placed on the bottom of said surface water and maintain said water at a pH of about 6.5.

4. The method of claim 3 wherein said blocks are placed in an inlet to a lake.

5. The method of claim 1 wherein said blocks weigh between about 25 and 50 pounds and are manually placed on the bottom of said surface water.

6. The method of claim 5 wherein said alkaline material is lime, and said blocks have a total weight of about 70 pounds per acre of surface water per foot average depth.

* * * * *

UNITED STATES PATENT AND TRADEMARK OFFICE
CERTIFICATE OF CORRECTION

PATENT NO. : 5,298,173

DATED : March 29, 1994

INVENTOR(S) : W. Roy BURKE

It is certified that error appears in the above-identified patent and that said Letters Patent is hereby corrected as shown below:

Column 2, line 53, between the words "being" and "subjected", the word "Constantly" should be --constantly--.

Column 3, line 27, before the abbreviation "F.", the characters "68o-70o" should be -- 68°-70°--.

Signed and Sealed this

Thirteenth Day of September, 1994

Attest:

BRUCE LEHMAN

*Attesting Officer*       *Commissioner of Patents and Trademarks*